(12) United States Patent
Shimoshimano et al.

(10) Patent No.: US 8,332,100 B2
(45) Date of Patent: Dec. 11, 2012

(54) VEHICLE-MOUNTED DEVICE

(75) Inventors: Hideo Shimoshimano, Hachiouji (JP); Nobuyuki Hotta, Hachiouji (JP); Kouji Kuga, Sagamihara (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 344 days.

(21) Appl. No.: 12/679,198

(22) PCT Filed: Sep. 25, 2008

(86) PCT No.: PCT/JP2008/067225
§ 371 (c)(1),
(2), (4) Date: Mar. 19, 2010

(87) PCT Pub. No.: WO2009/041455
PCT Pub. Date: Apr. 2, 2009

(65) Prior Publication Data
US 2010/0241310 A1    Sep. 23, 2010

(30) Foreign Application Priority Data
Sep. 28, 2007  (JP) .................................. 2007-254111

(51) Int. Cl.
*G06F 7/00*    (2006.01)
(52) U.S. Cl. ........................................ 701/36
(58) Field of Classification Search ............ 701/36, 701/40, 400, 414, 415, 419
See application file for complete search history.

(56) References Cited

U.S. PATENT DOCUMENTS

| | | | |
|---|---|---|---|
| 2004/0019681 A1* | 1/2004 | Nakamura et al. | 709/226 |
| 2005/0144284 A1* | 6/2005 | Ludwig et al. | 709/226 |
| 2007/0015485 A1* | 1/2007 | DeBiasio et al. | 455/345 |
| 2007/0127734 A1* | 6/2007 | Brulle-Drews | 381/86 |
| 2008/0178226 A1* | 7/2008 | Lee | 725/68 |
| 2009/0299857 A1* | 12/2009 | Brubaker | 705/14.66 |

FOREIGN PATENT DOCUMENTS

| | | |
|---|---|---|
| JP | 63-271633 | 11/1988 |
| JP | 08-285628 | 11/1996 |
| JP | 2003-272360 | 9/2003 |
| JP | 2006-038766 | 2/2006 |
| JP | 2006-047034 | 2/2006 |
| JP | 2006038766 A * | 2/2006 |
| JP | 2006-194633 | 7/2006 |

OTHER PUBLICATIONS

International Preliminary Report on Patentability (Application No. PCT/JP2008/067225) dated May 14, 2010.
International Search Report for PCT/JP2008/067225 dated Nov. 4, 2008.

* cited by examiner

*Primary Examiner* — Faye M. Fleming
(74) *Attorney, Agent, or Firm* — Eric J. Robinson; Robinson Intellectual Property Law Office, P.C.

(57) ABSTRACT

Reproduction is performed so that the user can grasp the details of content information on long sentence reading the reproduction of which has been suspended. If an vehicle-mounted device (10) receives content information with higher priority of the reproduction than that of the content information on the long sentence reading during the reproduction of the content information on the long sentence reading received from a center apparatus by a reproduction section (step S4; Y), the vehicle-mounted device (10) allows the control of a control unit to suspend the reproduction of the content information on the long sentence reading (step S7) and to start the reproduction of the content information with higher priority (step S8). If the reproduction ends, the vehicle-mounted device (10) allows the reproduction means to resume the suspended reproduction of the content information on the long sentence reading (step S12).

3 Claims, 7 Drawing Sheets

FIG. 2

| | |
|---|---|
| CONTENTS | TEXT INFORMATION |
| | IMAGE INFORMATION |
| | READING INFORMATION (TTS) |
| ENTERPRISER | ENTERPRISER CODE |
| | . . . |
| INFORMATION PROVIDER | INFORMATION PROVIDING COMPANY CODE |
| | . . . |
| REPRODUCTION REQUIREMENT | DIRECT/ACCUMULATION |
| REPRODUCTION SCHEDULE POINT | COORDINATES (LATITUDE/LONGITUDE) |
| | INFORMATION PROVISION START POSITION (AREA CENTRAL COORDINATES, AREA RADIUS, TRAVELING DIRECTION) |
| | . . . |
| INFORMATION SORT | SORT CODE |
| PRIORITY | PRIORITY (MOST PRIOR, PRIOR, SELECTABLE) |
| . . . | . . . |

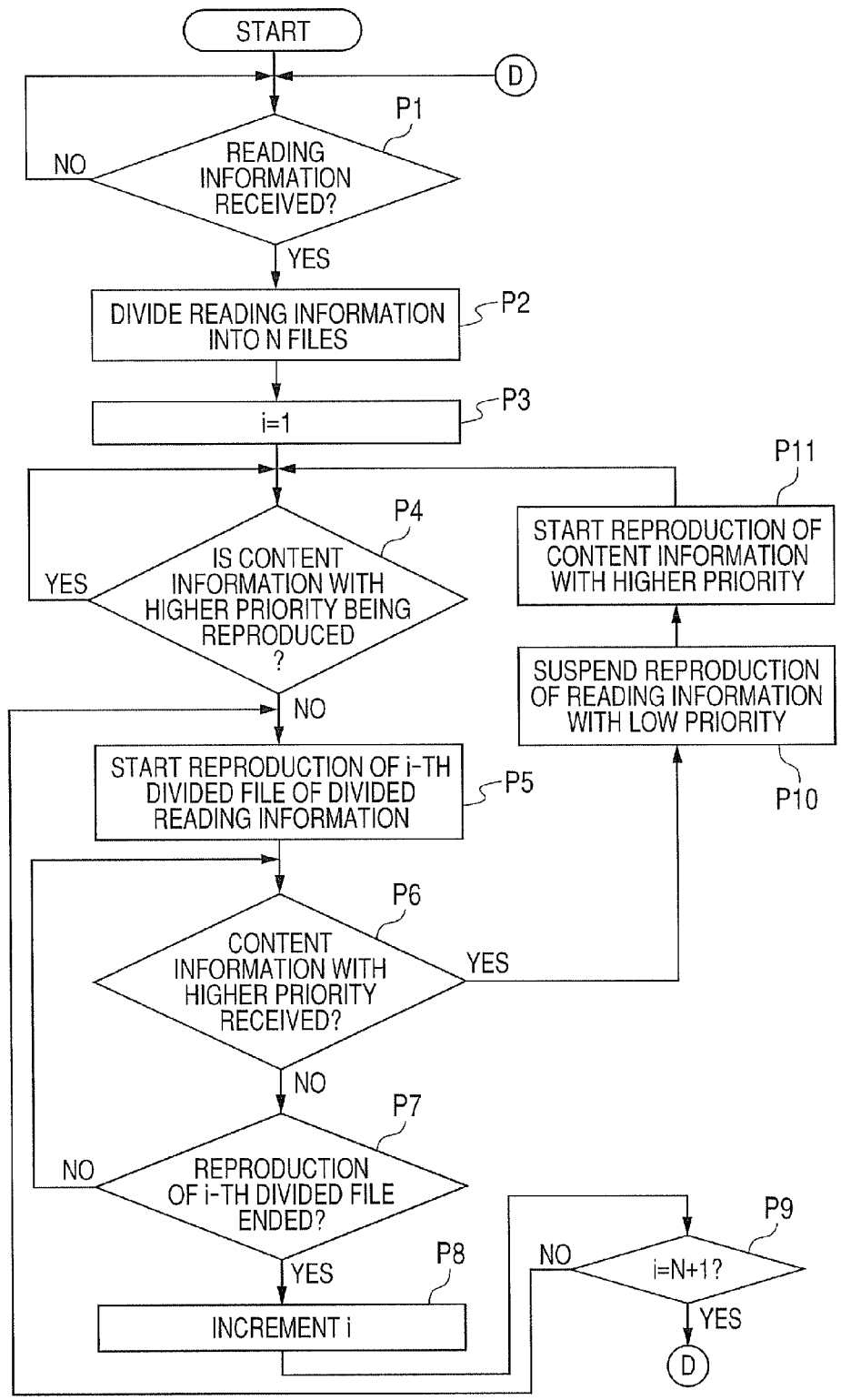

VEHICLE-MOUNTED DEVICE

TECHNICAL FIELD

The present invention relates to an vehicle-mounted device.

BACKGROUND ART

Conventionally, in an vehicle-mounted device such as a navigation apparatus, narrow-band wireless communication is performed with a roadside apparatus placed on a road by using DSRC (Dedicated Short Range Communication) and the like, and information provision can be received from a center apparatus via the roadside apparatus. More specifically, only while a vehicle is within a communication range of the roadside apparatus, two-way communication of the vehicle-mounted device of a vehicle and the roadside apparatus is enabled, and during this period, the center apparatus distributes various kinds of content information such as advertisement information via the roadside apparatus.

The content information is divided into a direct type and an accumulation type according to the timing of reproduction. The direct type refers to content information of a type which is directly reproduced as soon as the content information is received, whereas the accumulation type refers to content information of a type which is temporarily accumulated instead of being reproduced immediately when it is received, and is reproduced when the vehicle reaches a certain point (location) or the like. In general, a direct type is more often than not the information with higher necessity, and the priority of reproduction is set to be higher than an accumulation type.

Meanwhile, as one kind of content information the voice reading of which is performed, the one of a highway radio is cited. A highway radio is traffic information or the like which is provided at each of certain locations. (For example, see Patent Document 1).

Conventionally, various arts have been developed with regard to reproduction of music information. For example, there is a method (for example, see Patent Document 1), in which when reproduction of music information is suspended, and reproduction of ITS (Integrated Traffic System) information is performed by an interrupt, the suspended reproduction of the music information or the like is performed by returning to the time point of the interrupt after the reproduction of the ITS information ends. Further, the method is also developed which reproduces music information by changing the tone or the like of the music so that other information also can be received during reproduction of the music information (for example, see Patent Document 2).

Patent Document 1: Japanese Patent Application Laid-Open No. 2003-85689
Patent Document 2: Japanese Patent Application Laid-Open No. 2007-86316

DISCLOSURE OF THE INVENTION

Problems to be Solved by the Invention

However, in the case of the content information of a highway radio, in order to grasp the details of the information, it is sometimes desired to perform reproduction from the beginning instead of the suspended time point. Further, since the highway radio is reproduced by voice reading, if the intonation or the like is changed, it becomes difficult to hear, and it is conceivable that the details of the information sometimes cannot be grasped.

An object of the present invention is to perform reproduction so that a user can grasp the details of content information for reading the reproduction of which has been suspended.

Means for Solving the Problems

According to a first aspect of the present invention, an vehicle-mounted device is provided, which includes
communication means for performing wireless communication with a center apparatus via a roadside apparatus,
reproduction means for performing audio reproduction based on content information received from the center apparatus by the communication means, and
control means for suspending reproduction of content information for reading, when the vehicle-mounted device receives content information with higher priority of reproduction than the content information for reading during the reproduction of the content information for reading received from the center apparatus via the communication means by the reproduction means, starts reproduction of the content information with high priority, resumes the suspended reproduction of the content information for reading by the reproduction means when the reproduction ends, and controls a method of the reproduction.

In the vehicle-mounted device according to the present invention, the control means reproduces the content information for reading by resuming the reproduction from the beginning to the end without suspension.

In the vehicle-mounted device according to the present invention, the control means reproduces the suspended content information for reading by repeating the reproduction a set number of times.

In the vehicle-mounted device according to the present invention, the control means judges a reproduction position at which the reproduction is suspended in the content information for reading, and resumes the reproduction of the content information for reading from the reproduction position.

In the vehicle-mounted device according to the present invention, the control means judges a reproduction position for resuming the reproduction, as to whether to reproduce the content information for reading from the beginning, or to reproduce from the suspended reproduction position, based on the reproduction position at which the reproduction is suspended in the content information for reading, and resumes the reproduction from the judged reproduction position.

In the vehicle-mounted device according to the present invention, the vehicle-mounted device is provided, wherein the content information for reading is information for voice synthesis, and the control means determines a position of a period or a comma of a reading sentence whose reproduction is suspended based on the information for voice synthesis, and resumes the reproduction from the position of the period or the comma.

Effect of the Invention

According to the vehicle-mounted device according to the present invention, even if reproduction of content information for reading is suspended, a user can watch and listen to the content information for reading, and can grasp the details of it.

BRIEF DESCRIPTION OF THE DRAWINGS

FIG. 2 is a format example of content information;

FIG. 7 is a flowchart explaining a reproduction control process according to a second embodiment.

DESCRIPTION OF SYMBOLS

100 DISTRIBUTION SYSTEM
10 VEHICLE-MOUNTED DEVICE
1 CAR NAVIGATION UNIT
1*d* OPERATION UNIT
1*e* DISPLAY UNIT
1*f* STORAGE UNIT
3 DSRC UNIT
3*a* DSRC CONTROL UNIT
3*b* COMMUNICATION UNIT
3*c* STORAGE UNIT
4 CONTROL UNIT
5 REPRODUCTION UNIT
20 ROADSIDE APPARATUS
30 CENTER APPARATUS

BEST MODES FOR CARRYING OUT THE INVENTION

First Embodiment

In a first embodiment, an example will be described, in which when reproduction of content information for reading is suspended, the suspended reproduction of the content information for reading is resumed, and the content information is reproduced from the beginning to the end without breaking.

First, the configuration will be described.

Figure 1:
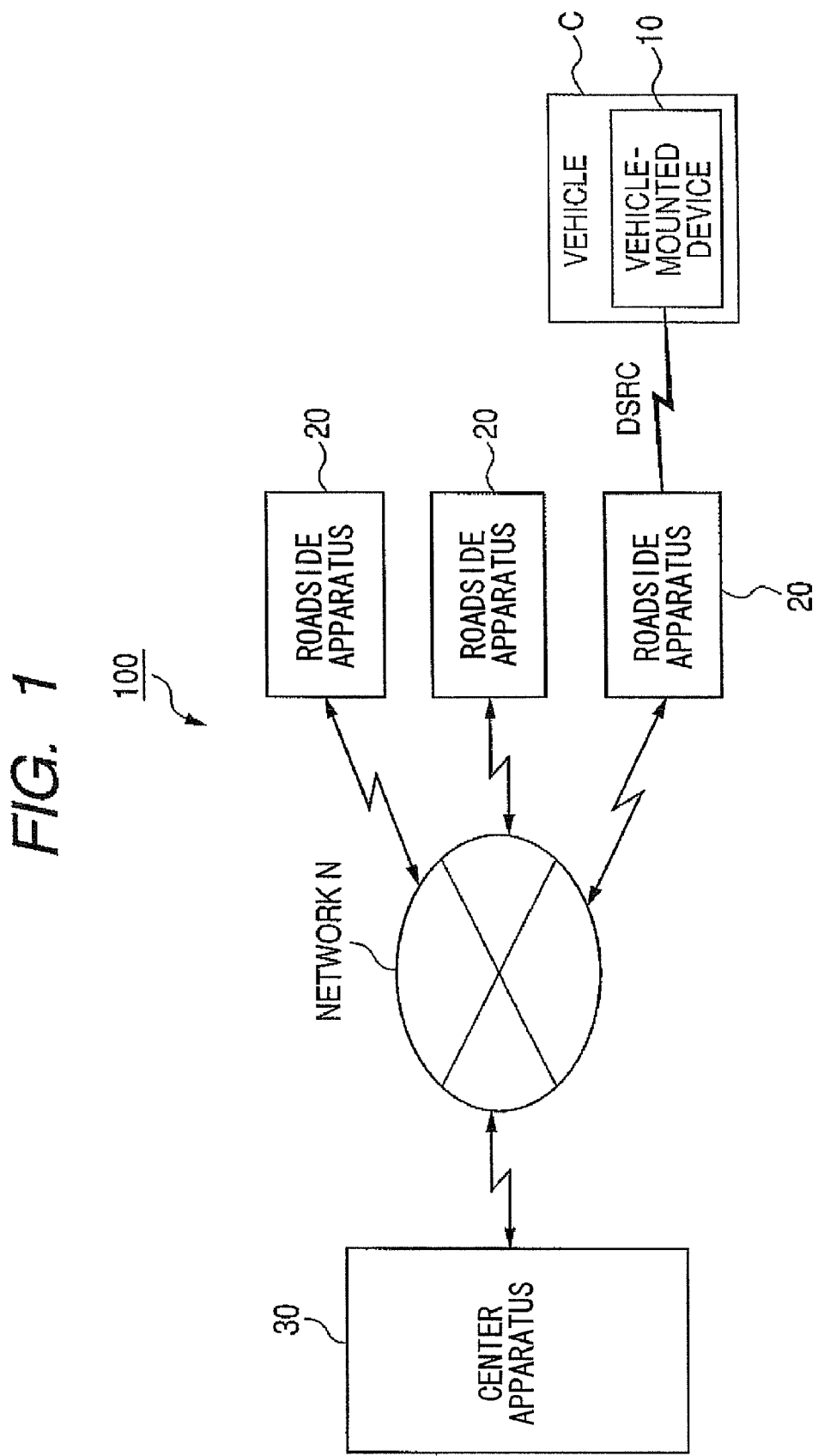
FIG. 1 is a diagram showing a configuration of a distribution system.

FIG. 1 shows a system configuration of a distribution system 100 including an vehicle-mounted device in the first embodiment.

The distribution system 100 is configured by including an vehicle-mounted device 10 loaded on a vehicle C, a roadside apparatus 20 and a center apparatus 30 as shown in FIG. 1, and the center apparatus 30 distributes content information to the vehicle-mounted device 10 via the roadside apparatus 20. The content information refers to text information, image information, voice information and the like which are provided to a user, and as the contents of it, for example, various things are cited such as advertisements of stores, and directories to a parking lot and facilities in addition to traffic information by a highway radio. The details of the content information will be described later.

Hereinafter, each component device will be described in detail.

The center apparatus 30 stores content information, and distributes it to the vehicle-mounted device 10. As the center apparatus 30, a computer terminal or the like including a control unit that performs distribution control, a communication unit that performs communication with the roadside apparatus 20, and a storage unit that stores the content information can be applied.

FIG. 1 shows only one center apparatus 30, but there are a plurality of distribution enterprisers that distribute content information, and each of the distribution enterprisers includes the center apparatus 30.

Here, the content information which the center apparatus 30 distributes will be described.

FIG. 2 is a diagram showing one example of a format of the content information.

As shown in FIG. 2, the content information includes information such as the distribution enterpriser of the content information, the information provider, the reproduction requirement, the reproduction schedule point for performing information provision, the information sort, and the priority in addition to the contents (text information, image information, voice information and the like).

Figure 3:
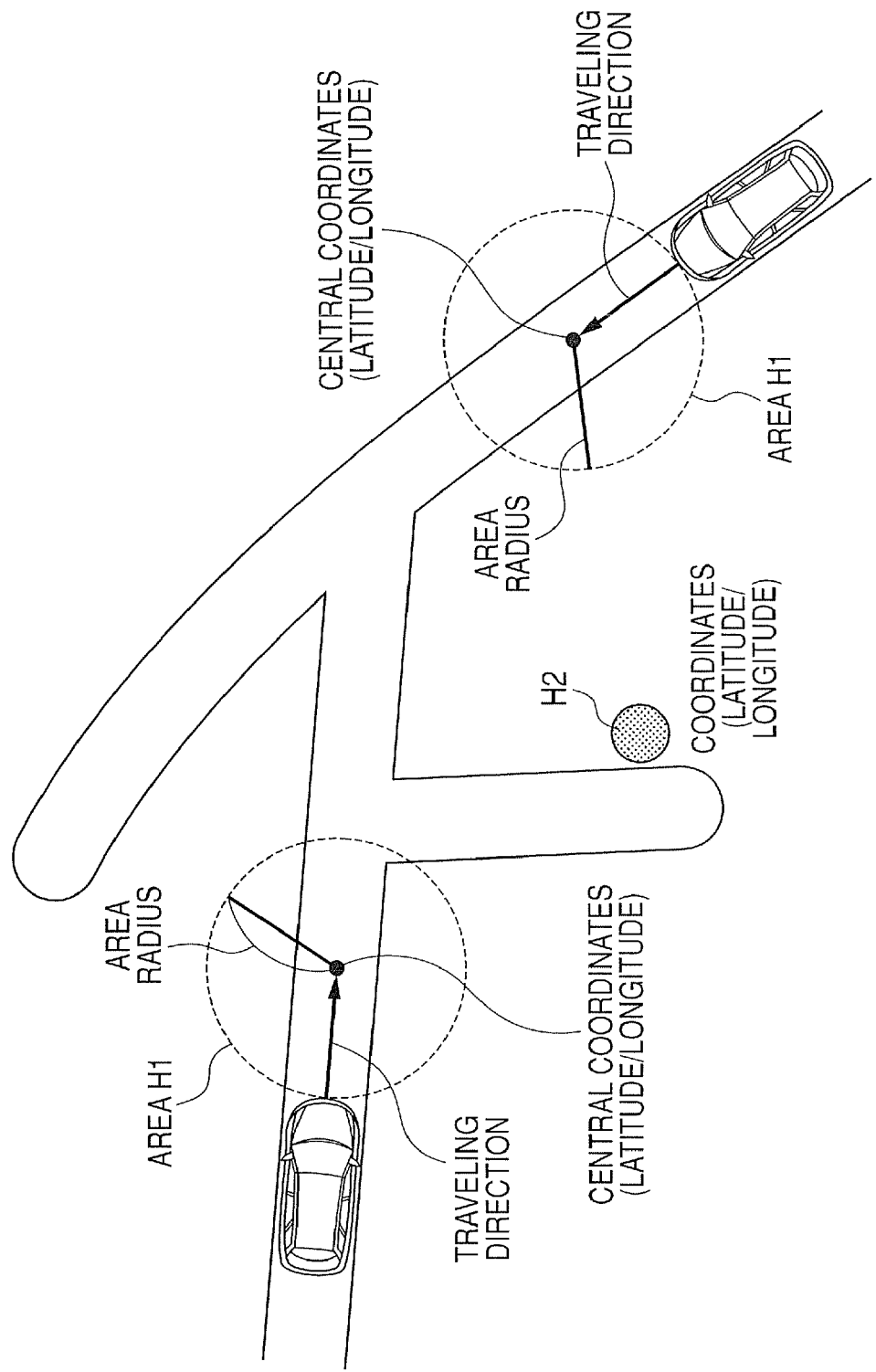
FIG. 3 is a view explaining a reproduction schedule point of accumulation type content information.

The content information is divided into a direct type and accumulation type according to the timing of reproduction, the content information includes the information of the reproduction requirement showing which type the content information belongs to. The direct type is reproduced directly after reception, and the accumulation type is temporarily accumulated (stored in the memory), and is reproduced when the vehicle reaches the reproduction schedule point. The reproduction schedule point refers to an area H1 on a road, and an installation location H2 of a store or the like, which are designated as the positions for starting reproduction as shown in FIG. 3. The content information includes the information (information such as coordinates showing a position) of the reproduction schedule point, and therefore, the vehicle-mounted device 10 analyzes the designated information and determines whether the vehicle reaches the reproduction schedule point, and performs reproduction of the accumulation type content information.

In the case of the designated area H1 on the road, the content information includes the information of the central coordinates (latitude/longitude) of the circular area H1, the traveling direction of the vehicle C to the central coordinates and the information provision start position of the area radius. In the vehicle-mounted device 10, the designated information is analyzed, and when the vehicle C reaches the distance of the radius from the central coordinates, and the designated traveling direction and the traveling direction of the vehicle C correspond to each other, reproduction of the content information is started.

Further, the content information the audio reproduction of which is performed includes content for reading (hereinafter, called reading information) which is constituted of TTS (Text to Speech). TTS is information for voice synthesis, and when reading information is reproduced, the process of generating voice information based on TTS is needed. As one example of the reading information, a highway radio is cited. A highway radio means radio broadcasting provided on a highway by NEXCO (Nippon EXpressway COmpany Limited), and the reading information with the same content as radio broadcasting can be provided from the center apparatus 30.

Further, the content information includes information of an information sort. An information sort means the sort in which information is classified according to the contents, and there are sorts of, for example, traffic regulation information, disaster regulation information, congestion information, weather information, parking information and the like.

Further, the content information is classified into most prior information, prior information, and selectable information depending on the priority of reproduction. The priority is higher in the order of the most prior information, the prior information and the selectable information. The most prior information is the content information which is reproduced immediately after it is received. The direct type content information applies to the most prior information. For example, emergency message information such as notification of an earthquake is cited, and prior information is the one that is necessarily reproduced after reception, but the timing of the reproduction is not especially designated. For example, caution and warning information of an accident or the like is cited. Selectable information is the information the reproduction of which can be selected by a user, and the timing of the reproduction is not especially designated. For example, ordinary advertisement information, a highway radio and the like apply to it.

The content information includes the information of the priority indicating which of the most prior information, the prior information and the selectable information the content information applies to, and the vehicle-mounted device 10 judges the priority of the content information by analyzing the information.

A plurality of roadside apparatuses 20 are installed on a road, a parking lot and the like, and each of the roadside apparatuses 20 is connected to the center apparatus 30 via a network N. Further, the roadside apparatus 20 and the vehicle-mounted device 10 of the vehicle C traveling on a road can perform wireless communication.

Figure 4:
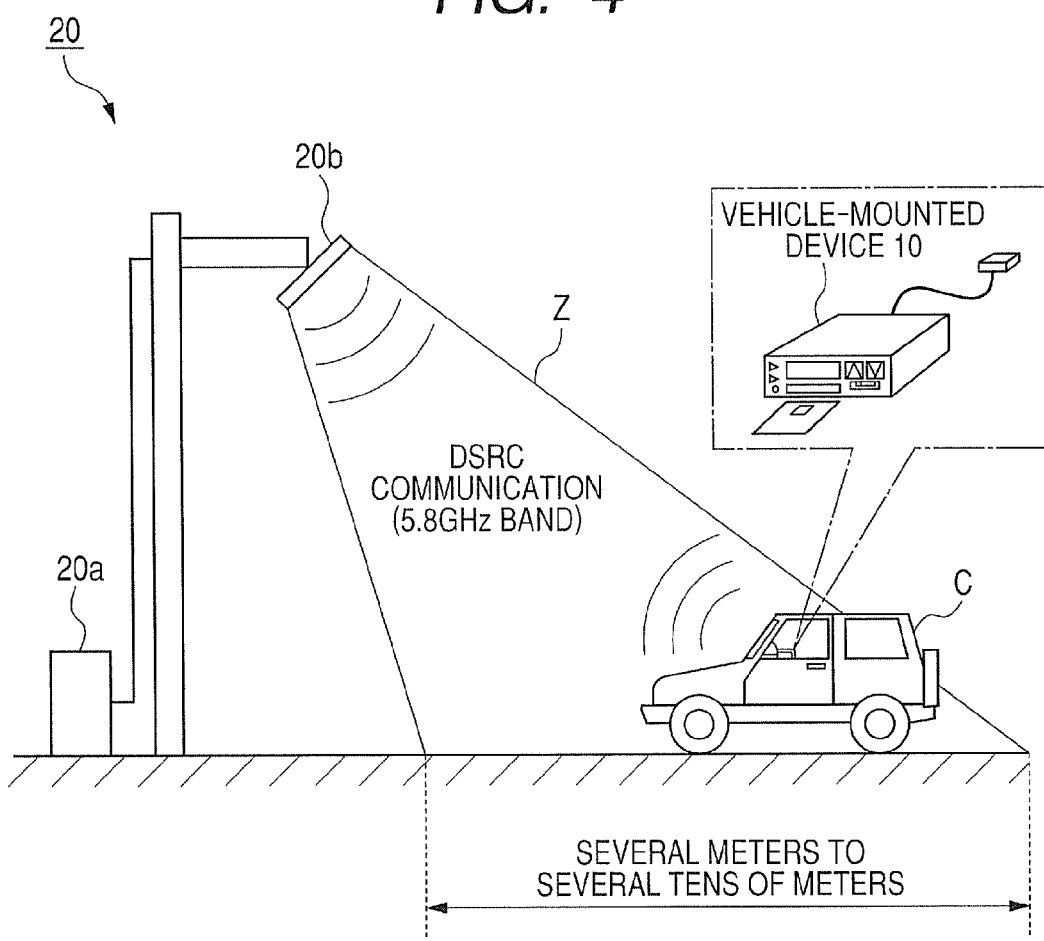
FIG. 4 is a view explaining a roadside area of a roadside apparatus of FIG. 1.

The roadside apparatus 20 is configured by a main body device 20a and an antenna 20b as shown in FIG. 4. The roadside apparatus 20 irradiates radio waves of DSRC the arrival range of which is limited, from the antenna 20b installed besides a road or above the road, and forms a roadside area Z in the vicinity of the roadside apparatus 20. Two-way narrow-band wireless communication is enabled with only the vehicle-mounted device 10 of the vehicle C within the roadside area Z. Hereinafter, narrow-band wireless communication between the roadside apparatus 20 and the vehicle-mounted device 10 is sometimes called road-vehicle communication.

DSRC is a communication method using a radio wave of a bandwidth of 5.8 GHz, and its communication range is, for example, from several meters to several tens meters. The transmission output of DSRC from each of the roadside apparatuses 20 is set at the same level, and therefore, the roadside areas Z formed by a plurality of roadside apparatuses 20 are substantially constant irrespective of the installed places.

The main body device 20a performs processing for mediating exchange of information between the vehicle-mounted device 10 and the center apparatus 30. More specifically, the information received from the vehicle-mounted device 10 via the antenna 20b is transferred to the center apparatus 30, and the content information transmitted from the center apparatus 30 is transferred to the vehicle-mounted device 10. For the main body device 20a, the computer terminal can be applied, which includes the control unit for performing information processing and communication control, a storage unit and the like.

The vehicle-mounted device 10 is loaded on the vehicle C, and has the function of performing processing for using an ETC (Electronic Toll Collection System) by DSRC and the like, in addition to the navigation function of performing processing or the like for leading to the guide route.

Figure 5:
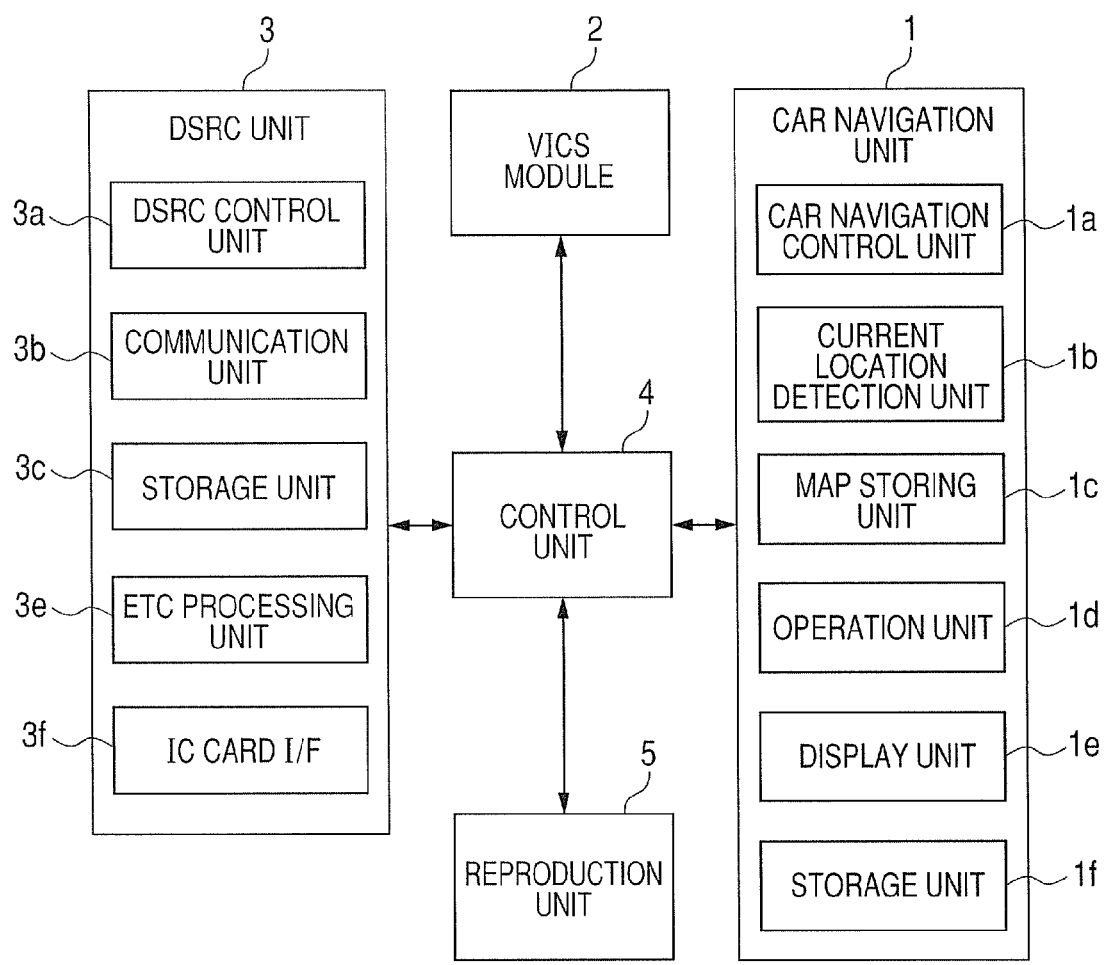
FIG. 5 is a diagram showing a configuration of an vehicle-mounted device of FIG. 1.

The vehicle-mounted device 10 is configured by including a car navigation unit 1, a VICS module 2, a DSRC unit 3, a control unit 4, and a reproduction unit 5 as shown in FIG. 5.

The control unit 4 is configured by a CPU (Central Processing Unit), a RAM (Random Access Memory) and the like, and performs centralized control of each unit in addition to various arithmetic operations by cooperation with the control program stored in the storage unit 1f.

For example, when performing road-vehicle communication with the roadside apparatus 20, the control unit 4 controls a communication operation of the DSRC unit 3. On control of the DSRC unit 3, the control unit 4 performs control by cooperation with the DSRC control unit 3a of the DSRC unit 3. Further, the control unit 4 performs storage, display control and the like of the content information received from the center apparatus 30 via the DSRC unit 3.

The car navigation unit 1 includes a car navigation control unit 1a, a current location detection unit 1b, a map storing unit 1c, an operation unit 1d, a display unit 1e, a storage unit 1f and the like, and performs a process for leading the vehicle C to the guide route.

The car navigation control unit 1a calculates the guide route to a destination site which is set via the operation unit 1d from the current location of the vehicle C based on the information of the current location acquired from the current location detection unit 1b, the map information stored in the map storing unit 1c and the like. Subsequently, the car navigation control unit 1a generates a map screen for leading to the calculated guide route by using the map information stored in the map storing unit 1c, and causes the display unit 1e to display it.

The current location detection unit 1b includes various sensors such as a GPS antenna, an angle sensor, an azimuth sensor, and a distance sensor, and detects the current location of the vehicle C based on the detection result by these sensors. The GPS antenna detects a GPS signal transmitted from a GPS satellite. Further, the angle sensor detects the acceleration (rotational speed in the horizontal direction per unit time) of the vehicle indicating the change amount in the moving direction, and the azimuth sensor performs detection of geomagnetism and detects the absolute azimuth of the vehicle. The current location detection unit 1b generates the current location information (information of longitude, latitude and the like) indicating the current location of the vehicle based on each of the detection results acquired from these sensors, and outputs it to the car navigation control unit 1a.

The map storing unit 1c is configured by a recording medium such as a memory and a DVD, and stores map information necessary for guide display, guide information (road information, congestion information and the like) received via the VICS module 2 and the like.

The operation unit 1d is configured by a touch panel or the like configured integrally with an operation key and the display unit 1e. The operation unit 1d generates operation signals corresponding to operations of them, and outputs them to the control unit 31.

The display unit 1e includes a monitor, and displays various kinds of information on the monitor according to the control of the control unit 4. For example, they are a setting screen, a map screen, a display screen of the content information received from the center apparatus 30 and the like.

The storage unit 1f is configured by a memory, and stores control programs executed by the control unit 4 and the car navigation control unit 1a, and parameters, data and the like necessary for execution of the programs.

Further, the storage unit 1f stores the content information received from the center apparatus 30.

The VICS module 2 includes antennas for optical communication, for FM communication and for 2.4 GHz radio wave communication, and performs optical communication, FM communication and radio wave communication with the VICS center. The VICS module 2 receives congestion information, road traffic information and the like from the VICS center, and outputs them to the control unit 31.

The DSRC unit 3 performs a process for ETC use by the DSRC, communication processing for receiving the content information from the center apparatus 30 and the like.

The DSRC unit 3 is configured by including a DSRC control unit 3a, a communication unit 3b, a storage unit 3c, an ETC processing unit 3e and an IC card I/F 3f as shown in FIG. 5.

The DSRC control unit 3a is configured by a CPU, a RAM and the like, and controls the operation of each unit of the DSRC unit 3 by cooperation with the control program stored in the storage unit 3c.

For example, when payment by ETC is performed, the DSRC control unit 3a controls the communication operation of the communication unit 3b to cause it to perform transmission and reception of payment information to and from the ETC base station (the wireless base station provided in the vicinity of an ETC gate or the like for making ETC payment). Further, write processing of the payment information is performed by the ETC processing unit 3e.

Further, when the content information is received by the communication unit 3b via the roadside apparatus 20, the DSRC control unit 3a outputs the content information to the control unit 4.

The communication unit 3b includes an antenna fixedly provided on the dashboard of the vehicle C and near a windshield, and performs transmission and reception of the radio waves of DSRC to and from the roadside apparatus 20, the ETC base station and the like via the antenna.

The storage unit 3c stores the control program and the like executed by the DSRC control unit 3a.

The ETC processing unit 3e reads and writes the payment information and the like from and to a credit card, debit card and the like with IC, which is inserted in and extracted from the IC card I/F 3f.

The IC card I/F 3f includes a slot for the above described credit card or the like, and mediates exchange of information between the IC of the credit card or the like inserted in the slot and the ETC processing unit 3e.

The reproduction unit 5 includes a speaker or the like and performs audio reproduction.

In the case of performing reproduction of reading information, the reading information is described in an intermediate language, and therefore, the reproduction unit 5 performs reading reproduction processing of converting the reading information into voice information and reproducing it. In reading reproduction processing, reading information is analyzed, and parameters (voice element piece, duration time length of a phoneme, a pitch, a time change pattern of amplitude and the like) necessary for voice synthesis are generated. A voice waveform is synthesized by using the generated parameters. The reproduction unit 5 outputs signals of synthesized voice by a speaker, and performs audio reproduction.

Next, an operation of the vehicle-mounted device 10 in the first embodiment will be described.

Figure 6:
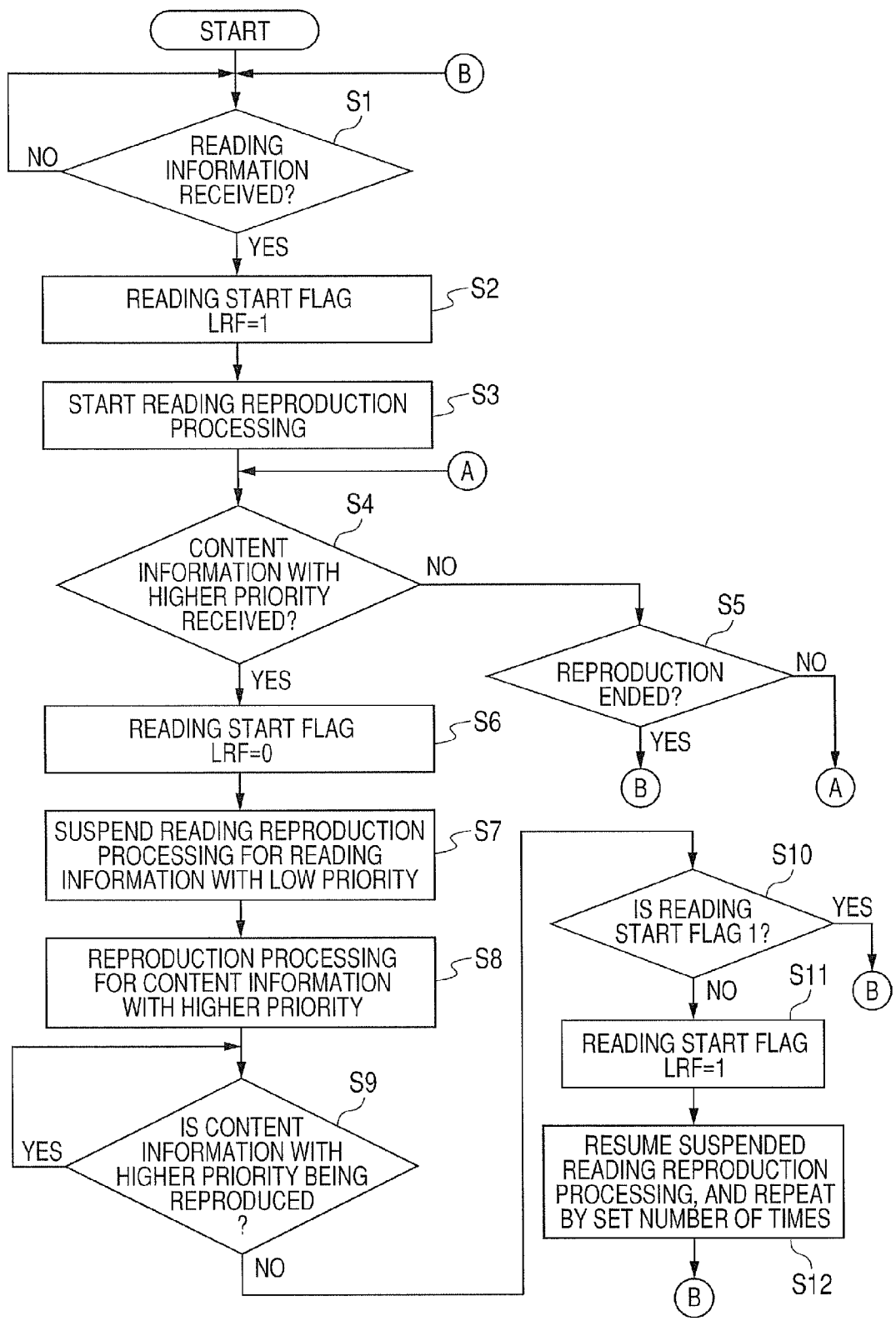
FIG. 6 is a flowchart explaining a reproduction control process according to a first embodiment.

FIG. 6 is a flowchart explaining the flow of reproduction control process executed by the vehicle-mounted device 10. The reproduction control process is a process of controlling reproduction of the reading information which is suspended so that a user can easily watch and listen to it when the reproduction of the reading information with low priority is suspended by interrupt reproduction of the content information with high priority. The process is realized by cooperation of the control program stored in the storage unit 1f and the control unit 4.

As the precondition of the description, in the reproduction control process, when the suspended reproduction of the reading information is resumed, the reading information is repeatedly reproduced, and a user sets the number of repetitions in advance. For example, when operation of inputting twice is performed through the operation unit 1d, the control unit 4 stores this in the storage unit if as the set number of times at the time of repeated reproduction.

In the reproduction control process shown in FIG. 6, when the vehicle C enters the roadside area Z of the roadside apparatus 20, and the control unit 4 of the vehicle-mounted device 10 judges that the content information received from the center apparatus 30 via the roadside apparatus 20 is the reading information of the highway radio or the like (step S1), a reading start flag LRF is provided with respect to the reading information, and is set as LRF=1 (step S2). LRF=1 indicates start of reading reproduction process, and LRF=0 indicates that the reading reproduction process is suspended. The reading start flag LRF is stored in a work memory or the like in the control unit 4.

Next, the control unit 4 starts the reading reproduction process by the reproduction unit 5 based on the received reading information (step S3). Next, the control unit 4 determines whether or not it receives the content information with higher priority than reading information received in advance (step S4). When the content information itself is not received, or when it is received but the content information is not the information the audio reproduction of which is not performed, or has priority equivalent to or lower than that of the reading information (step S4; N), the control unit 4 determines whether or not the reproduction of the reading information which is being reproduced is finished (step s5). When the reproduction of the reading information is finished (step S5; Y), the flow returns to the process of step S1. When reproduction is unfinished (step S5; N), the flow returns to step S4, and judgment whether the content information with higher priority is received during reproduction is repeated.

Meanwhile, when the content information with higher priority is received (step S4; Y), for example, when the direct type content information which is the most prior information is received, the control unit 4 rewrites the reading start flag LRF with respect to the reading information which is being reproduced to LRF=0 (step S6), and suspends the reproduction of it by the reproduction unit 5 (step S7). When accumulation type content information with higher priority is received and stored in advance, and the vehicle reaches the reproduction schedule point, it is determined that the content information with higher priority is received, and the reproduction of the reading information is suspended. After suspending it, the control unit 4 starts the reproduction of the received content information with higher priority which is received by the reproduction unit 5 (step S8).

Next, the control unit 4 judges whether the content information with higher priority is being reproduced (step S9), and when judging that the reproduction is finished (step S9; N), the control unit 4 refers to the reading start flag LRF of the suspended reading information. When the reading start flag LRF=1 (step S10; Y), the flow goes to the process of step S1. Meanwhile, when LRF=0 (step S10; N), the control unit 4 judges that the reproduction of the reading information is suspended, and rewrites it to LRF=1 (step S11).

Subsequently, the control unit 4 resumes the suspended reproduction of the reading information from a midpoint by the reproduction unit 5, and repeats the reproduction of the reading information by set number of times from the beginning to the end without breaking (step S12). The set number of times is the number of times which is set in advance by the user and is stored in the storage unit 1f as described above. When the reproduction repeated by the set number of times is finished, the flow returns to step S1.

As above, according to the first embodiment, when the content information with higher priority of reproduction than reading information is received during reproduction of the reading information, the control unit 4 suspends the reproduction of the reading information by the reproduction unit 5, and starts reproduction of the content information with higher priority. When the reproduction is finished, the control unit 4 resumes the suspended reproduction of the reading information by the reproduction unit 5, and reproduces the reading information from the beginning to the end without breaking. Thereby, the user can watch and listen to whole of the reading information, and can sufficiently grasp the details.

Further, reproduction is repeated by the set number of times. Therefore, even 1f reproduction of the reading information is suspended, the user can set so as to reproduce the reading information by the amount sufficient for the user to understand details of the reading information.

The description of the above described first embodiment is a preferable example of the present invention, and the present invention is not limited to this.

For example, the suspended reproduction of the reading information is repeated by the set number of times, but the present invention is not limited to this, and the reproduction may be performed only in a certain section (distance) of 1 km or the like, or during a predetermined time.

Further, when content information such as an image and a text is received instead of content information the audio reproduction of which is performed, during reproduction of the reading information, the contents such as an image and a text can be displayed by the display unit 1e, and audio reproduction of the reading information can be continued. In this case, the time in which the contents such as an image and a text is displayed by interrupt is set in advance, and after a certain set time elapses, the contents may be hidden.

Second Embodiment

In a second embodiment, an example in which when reproduction of content information on long sentence reading is suspended, the content information on long sentence reading is reproduced from the suspended reproduction position will be described.

A distribution system and an vehicle-mounted device in the second embodiment are the same as the distribution system and the vehicle-mounted device in the first embodiment, and only differ in operation. Therefore, the same component units are assigned with the same reference numerals and characters, and only the operations will be described.

FIG. 7 is a flowchart showing reproduction control process according to the second embodiment.

As shown in FIG. 7, when the vehicle C enters the roadside area Z of the roadside apparatus 20, and the control unit 4 of the vehicle-mounted device 10 judges that the content information received from the center apparatus 30 via the roadside apparatus 20 is reading information of a highway radio or the like (step P1), the control unit 4 divides the reading information into N files (step P2). In order to identify each file (hereinafter, called a divided file) of the divided reading information individually, the control unit 4 assigns identification numbers in ascending numeric order from 1.

Next, the control unit 4 provides a parameter i, and sets the parameter i to an initial value 1 (step P3). The parameter i is for judging the divided file to be a subject in the process which will be described later.

Next, the control unit 4 judges whether the content information with higher priority is being reproduced in the reproduction unit 5 (step P4). When the content information is being reproduced (step P4; Y), judgment of step P4 is repeatedly performed until the reproduction is finished. When it is not originally reproduced, or when it was being reproduced, but it has been finished and is not being reproduced (step P4; N), reproduction of the i-th divided file of the reading information is started by the reproduction unit 5 (step P5).

Next, the control unit 4 judges whether or not the vehicle-mounted device 10 receives content information with higher priority than the reading information the reproduction of which is started (step P6).

First, the case in which the vehicle-mounted device 10 does not receive the content information with higher priority will be described.

When the vehicle-mounted device 10 does not receive the content information with higher priority (step P6; N), the control unit 4 judges whether or not the reproduction of the i-th divided file is finished in the reproduction unit 5 (step P7). If the reproduction is not finished (step P7; N), the flow returns to the process of step P6, and the control unit 4 judges whether the vehicle-mounted device 10 receives the content information with higher priority while continuing the reproduction of the i-th divided file. When reproduction is finished (step P7; Y), the control unit 4 increments i by +1 (step P8).

The control unit 4 judges whether i reaches i=N+1, that is, reproduction of the final divided file is finished (step P9). If i does not reaches i=N+1, and the reproduction of the final divided file is not performed (step P9; N), the flow returns to the process of step P5. More specifically, the flow goes to the reproduction of the i-th divided file which is incremented. Meanwhile, when i reaches i=N+1, and the reproduction of the final divided file is finished (step P9; Y), the flow returns to process of step S1.

Next, in step P6, the case of receiving content information with higher priority will be described.

When the content information with higher priority is received (step P6; Y), reproduction of reading information with low priority by the reproduction unit 5 is suspended (step P10), and reproduction of the content information with high priority is started (step P11). Thereafter, the flow returns to the process of step P4, and at a time point when the reproduction of the content information with higher priority is finished (step P4; N), the reproduction of the i-th divided file of the reading information the reproduction of which is suspended is resumed (step P5). More specifically, the reproduction of the reading information is resumed from the position at which the reproduction is performed at the time point when the reproduction is suspended.

As above, according to the second embodiment, when the content information with higher priority of reproduction than reading information is received during the reproduction of the reading information, the control unit 4 suspends the reproduction of the reading information by the reproduction unit 5, and starts the reproduction of the content information with higher priority. When the reproduction is finished, the reproduction of the reading information is resumed from the i-th divided file. More specifically, the reading information is divided, and the suspended reproduction position is judged on the basis of the sequence number of a divided file being reproduced, and the reproduction is resumed from the reproduction position.

Thereby, the user can watch and listen to the reading information from the suspended reproduction position. When the reproduction is suspended at a time point when the user finishes watching and listening to substantially most part of the reading information, the user can watch and listen to only the small remaining amount. Thereby, in this case, the remaining part can be watched and listened to more easily than when the reading information is reproduced from the beginning.

The above described second embodiment is one preferable example to which the present invention is applied, and the present invention is not limited to this.

For example, when reproduction of reading information is suspended, how much reproduction is finished may be stored by the information amount (number of bites), and when the reproduction of the reading information is resumed, the reproduction may be resumed from the reproduction position corresponding to the information amount. For example, when the reading information of 5 KB is suspended at a time point when the reproduction of the amount of 2 KB out of the reading information of 5 KB is finished, the reproduction is resumed from the reproduction position of 2 KB the reproduction of which is finished, next.

Further, a configuration may be adopted, which judges the reproduction position at which the reproduction is resumed, as to whether reproduction is performed from the suspended reproduction position, or reproduction is performed again from the beginning. For example, when the file is divided into ten divided files, if the reproduction is suspended in the first half part prior to the intermediate fifth file, the reproduction can be performed from the beginning, and if the reproduction is suspended in the latter half part which is in and after the sixth file, the reproduction can be resumed from the suspended reproduction position. Further, when the reproduction position is judged by the aforementioned information amount, if only the amount of 2 KB is reproduced out of the reading information of 5 KB, the reproduction can be performed from the beginning, and the reading information of 2 KB or more is reproduced, the reproduction can be resumed from the suspended reproduction position.

When reproduction is suspended when the reproduction of the reading information is just started, it is conceivable that more often than not, the user does not sufficiently grasp the details of the reproduced reading information. Therefore, in such a case, the reproduction method allows the user to grasp the details more easily by resuming the reproduction from the beginning than by resuming the reproduction from the suspended position as described above.

Further, a piece of music or the like notifying resumption may be reproduced just before the resumption. When it is judged whether the reproduction is performed from the suspended reproduction position, or the reproduction is performed from the beginning, pieces of music or the like to be reproduced are made different between them, so that the user can grasp by which method the reproduction is resumed.

Further, the reading information is written in TTS, and based on the TTS, the position of a period or a comma in the reading sentence can be judged. Therefore, it may be configured such that if the position of a period or a comma is judged, the reproduction is resumed from that position. According to this, reproduction can be resumed by sentence unit, and a user can easily listen to the details which have been read.

Further, as in the first embodiment, when content information of an image and a text is received instead of the content information the audio reproduction of which is performed during the reproduction of reading information, the contents of images and texts can be displayed by the display unit 1e, and audio reproduction of the reading information can be continued. In this case, the time for displaying the content of an image and a text by interrupt may be set in advance, and may be hidden after a set time elapses.

In the above described embodiment, reading information is watched and listened from the suspended reproduction position, but the reproduction position is not limited to this, and reading information may be watched and listened to from a position slightly before the reproduction position.

The invention claimed is:

1. A vehicle-mounted device, comprising:
   a communication unit adapted to perform wireless communication with a center apparatus via a roadside apparatus;
   a reproduction unit adapted to perform audio reproduction based on content information received from the center apparatus by the communication unit; and
   a control unit adapted to control a method of the reproduction to suspend reproduction of content information for reading, when the vehicle-mounted device receives content information with higher priority of reproduction than the content information for reading during the reproduction of the content information for reading received from the center apparatus via the communication unit by the reproduction unit, starts reproduction of the content information with higher priority, and resumes the suspended reproduction of the content information for reading by the reproduction unit when the reproduction ends,
   wherein the control unit reproduces the content information for reading by resuming the reproduction from the beginning to the end without suspension, and reproduces the suspended content information for reading by repeating the reproduction a set number of times.

2. A vehicle-mounted device, comprising:
   a communication unit adapted to perform wireless communication with a center apparatus via a roadside apparatus;
   a reproduction unit adapted to perform audio reproduction based on content information received from the center apparatus by the communication unit; and
   a control unit adapted to control a method of the reproduction to suspend reproduction of content information for reading, when the vehicle-mounted device receives content information with higher priority of reproduction than the content information for reading during the reproduction of the content information for reading received from the center apparatus via the communication unit by the reproduction unit, starts reproduction of the content information with higher priority, and resumes the suspended reproduction of the content information for reading by the reproduction unit when the reproduction ends,
   wherein the control unit judges a reproduction position at which the reproduction is suspended in the content information for reading, resumes the reproduction of the content information for reading from the reproduction position, and
   the control unit judges a reproduction position for resuming the reproduction, as to whether to reproduce the content information for reading from the beginning, or to reproduce from the suspended reproduction position, based on the reproduction position at which the reproduction is suspended in the content information for reading, and resumes the reproduction from the judged reproduction position.

3. The vehicle-mounted device according to claim 2, wherein the content information for reading is information for voice synthesis, and the control unit determines a position of a period or a comma of a reading sentence whose reproduction is suspended based on the information for voice synthesis, and resumes the reproduction from the position of the period or the comma.

* * * * *